(12) United States Patent
Yanase et al.

(10) Patent No.: US 8,382,560 B2
(45) Date of Patent: Feb. 26, 2013

(54) BARREL WORM-SHAPED TOOL

(75) Inventors: Yoshikoto Yanase, Ritto (JP); Masashi Ochi, Ritto (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 330 days.

(21) Appl. No.: 12/680,878

(22) PCT Filed: Aug. 1, 2008

(86) PCT No.: PCT/JP2008/063860
§ 371 (c)(1),
(2), (4) Date: Apr. 16, 2010

(87) PCT Pub. No.: WO2009/078193
PCT Pub. Date: Jun. 25, 2009

(65) Prior Publication Data
US 2010/0210198 A1  Aug. 19, 2010

(30) Foreign Application Priority Data

Dec. 14, 2007  (JP) ................................ 2007-322715

(51) Int. Cl.
*B23F 21/04* (2006.01)
(52) U.S. Cl. ...................................... 451/547; 451/540
(58) Field of Classification Search .................. 451/47, 451/58, 547, 541, 542, 147, 148, 141; 407/23, 407/26
See application file for complete search history.

(56) References Cited

U.S. PATENT DOCUMENTS

| 1,329,805 A | * | 2/1920 | Schurr | ............................ 409/38 |
| 4,174,914 A | | 11/1979 | Ainoura | |
| 5,205,679 A | * | 4/1993 | Nagata | ............................ 407/23 |

FOREIGN PATENT DOCUMENTS

| DE | 1 124 786 A | 3/1962 |
| FR | 2.070.927 A5 | 9/1971 |
| GB | 230884 | 3/1925 |
| JP | 60-39022 A | 2/1985 |
| JP | 60-194423 U | 12/1985 |
| JP | 64-78720 A | 3/1989 |

OTHER PUBLICATIONS

Hoyashita, "Barrel Worm-Shaped Tool With Conjugate Cutting-Edge Profile Generated From Tooth Profile of Internal Gear", Journal of the Japan Society of Mechanical Engineers (Series C), vol. 62, No. 593, pp. 284-290, Jan. 1996.
Taiwanese Notice of Allowance dated Jun. 2, 2011.

* cited by examiner

*Primary Examiner* — Dung Van Nguyen
(74) *Attorney, Agent, or Firm* — Birch, Stewart, Kolasch & Birch, LLP

(57) ABSTRACT

To provide a barrel worm-shaped tool capable of grinding processing in high precision, while maintaining the reduction of heavy load during the processing and partial wear. For this purpose, a barrel worm-shaped tool that is used in the gear machining of an internal gear (11) is formed with its diameter gradually increasing from the two end portions in the axial direction thereof towards the middle portion thereof. The barrel worm-shaped tool (12) is formed so that edge shapes (31) of the grinding wheel (12) becomes gradually smaller from the edge shape (31) located in the middle portion, in the axial direction of the barrel worm-shaped tool (12) towards the edge shape (31) located in the two end portions, in the axial direction, of the barrel worm-shaped tool (12) in accordance with the amount of machining allowance for the internal gear (11).

5 Claims, 9 Drawing Sheets

BARREL WORM-SHAPED TOOL

BACKGROUND OF THE INVENTION

1. Field of the Invention

The present invention relates to a barrel worm-shaped tool used in the grinding processing that is carried out, to finish, with precision, the tooth face of an internal gear after the heat treatment.

2. Description of the Related Art

In a common gear-production method, a form of gear is firstly shaped from a predetermined material of a gear through a processing of cutting teeth. The gear thus formed is then treated by heat, and, after that, the heated gear is finished (by a grinding processing) to remove the buckles and the like generated by the heat treatment. Various conventional-type tooth-profile grinding methods using tools such as WA grinding wheels and super-abrasive grinding wheels (e.g., diamond grinding wheels and CBN grinding wheels) have been employed for the purpose of finishing efficiently the tooth faces of the gear having been treated by heat. The tools used for this purpose have various shapes corresponding to the shapes of gears to be ground. Some of the examples of such shapes of tools include external-gear shapes, internal-gear shapes, and worm shapes.

Among the various types of gears, internal gears are quite often used in such apparatuses as automotive transmissions. The demand for improvement in precision is ever growing. Under the circumstances, a tooth-profile grinding method for the purpose of the grinding finishing on tooth faces of an internal gear using the barrel worm-shaped tool is disclosed in nonpatent document 1. What is proposed in the nonpatent document 1 is a calculation method for the edge profile of a barrel worm-shaped tool. The calculated edge profile of the tool is the one that fits the final state of the tooth profile of the internal gear that has been through the grinding.

[NONPATENT DOCUMENT 1] Shigeru HOYASHITA, "Barrel Worm-Shaped Tool with Conjugate Cutting-Edge Profile Generated from Tooth Profile of Internal Gear," *Journal of the Japan Society of Mechanical Engineers* (Series C), Vol. 62, No, 593, January 1996, pp. 284-290

SUMMARY OF THE INVENTION

Problems to be Solved by the Invention

Descriptions will be given, with reference to FIGS. 8 and 9, of a case where the grinding of an internal gear (hereafter, referred to as an internal gear 11) is carried out using a barrel worm-shaped tool (hereafter, referred to as a grinding wheel 12) proposed by the above-mentioned nonpatent document.

FIG. 8 shows that edge shapes 31 proposed by the above-mentioned nonpatent document are formed in the grinding wheel 12. When the grinding wheel 12 is used in the grinding of the internal wheel 11, machining-allowance tooth shapes (machining allowance) 21 formed in the internal gear 11 prevent the appropriate meshing of the edge shapes 31 with the machining-allowance tooth shapes 21.

With the above-described configuration, mating the teeth of the internal gear 11 and the edges of the grinding wheel 12 results in the contact of the grinding wheel 12 with the inner circumferential surface of the internal gear 11. Only the edge shapes 31 located in the two end portions, in the axial direction, of the grinding wheel 12 are brought into contact with the machining-allowance tooth shapes 21 of the internal gear 11. To put it other way, as FIG. 9 show, the edge faces 31b cut into the machining-allowance tooth shapes 21. The edge faces 31b is located on the outer-side of the edge shapes 31 located in the two end portions, in the axial direction, of the grinding wheel 12.

The grinding processing carried out under such edge-tooth mating conditions may possibly make a heavy load act locally on the two end portions, in the axial direction, of the grinding wheel 12 at the start of grinding processing. Irregularity in the grinding load and partial wear are some of the possible results of the locally-acting heavy load.

As has been described thus far, it is undesirable for the barrel-shaped grinding wheel 12 that the contact of the two end portions, in the axial direction, of the barrel-shaped grinding wheel 12 with the internal gear 11 precedes the contact of the middle portions, in the axial direction, of the grinding wheel 12 with the internal gear 11. What is desirable, conversely, is either the contact of the internal gear 11 evenly with the entire area, in the axial direction, of the grinding wheel 12 or the contact of the internal gear 11 with the middle portion, in the axial direction, of the grinding wheel 12.

The present invention, therefore, aims to achieve the above-described object. To be more specific, an object of the invention is providing a barrel worm-shaped tool which is capable of reducing the machining load and the partial wear and contributing to high-precision gear machining.

Means for Solving the Problems

A barrel worm-shaped tool according to a first aspect of the present invention to achieve the above-mentioned objects is a barrel worm-shaped tool used in the gear machining of an internal gear and formed with its diameter gradually increasing from the two end portions, in the axial direction, of the barrel worm-shaped tool towards the middle portion, in the axial direction, of the barrel worm-shaped tool. In the barrel worm-shaped tool, the barrel worm-shaped tool is formed so that edge shapes become gradually smaller from the edge shape located in the middle portion, in the axial direction, of the barrel worm-shaped tool towards the edge shapes located in the two end portions, in the axial direction, of the barrel worm-shaped tool in accordance with the amount of machining allowance for the internal gear.

A barrel worm-shaped tool according to a second aspect of the present invention to achieve the above-mentioned objects is characterized as follows. In the barrel worm-shaped tool according to the first aspect of the present invention, the edge shape located in the middle portion in the axial direction is designed to have a shape that is capable of meshing with corresponding tooth shapes of the internal gear after the machining. In addition, the edge shapes located in the two end portions in the axial direction are designed to have shapes that are capable of meshing with corresponding machining-allowance tooth shapes of the internal gear.

A barrel worm-shaped tool according to a third aspect of the present invention to achieve the above-mentioned objects is characterized as follows. In the barrel worm-shaped tool according to the first aspect of the present invention, the barrel worm-shaped tool is formed with the thicknesses of the edge shapes gradually decreasing.

A barrel worm-shaped tool according to a fourth aspect of the present invention to achieve the above-mentioned objects is characterized as follows. In the barrel worm-shaped tool according to the first aspect of the present invention, the barrel worm-shaped tool is formed with the heights of the edge shapes gradually decreasing.

A barrel worm-shaped tool according to a fifth aspect of the present invention to achieve the above-mentioned objects is characterized as follows. In the barrel worm-shaped tool according to the first aspect of the present invention, the barrel worm-shaped tool is formed with the heights of bottom lands of the edge shapes gradually decreasing.

Effects of the Invention

The barrel worm-shaped tool of the present invention is formed so that the size of its edge shape can gradually becomes smaller from the edge shape located in the middle portion, in the axial direction, towards the edge shapes located in the two end portions, in the axial direction, in accordance with the amount of the machining allowance for the internal gear. Accordingly, the machining load and the partial wear can be reduced, and thus high-precision grinding processing is made possible.

BRIEF DESCRIPTIONS OF THE DRAWINGS

DETAILED DESCRIPTION OF THE INVENTION

A barrel worm-shaped tool according to the present invention will be described in detail below with reference to the accompanying drawings. Members of similar structure and functions will be given identical reference signs across embodiments. The duplicated descriptions will be omitted.

Figure 1:
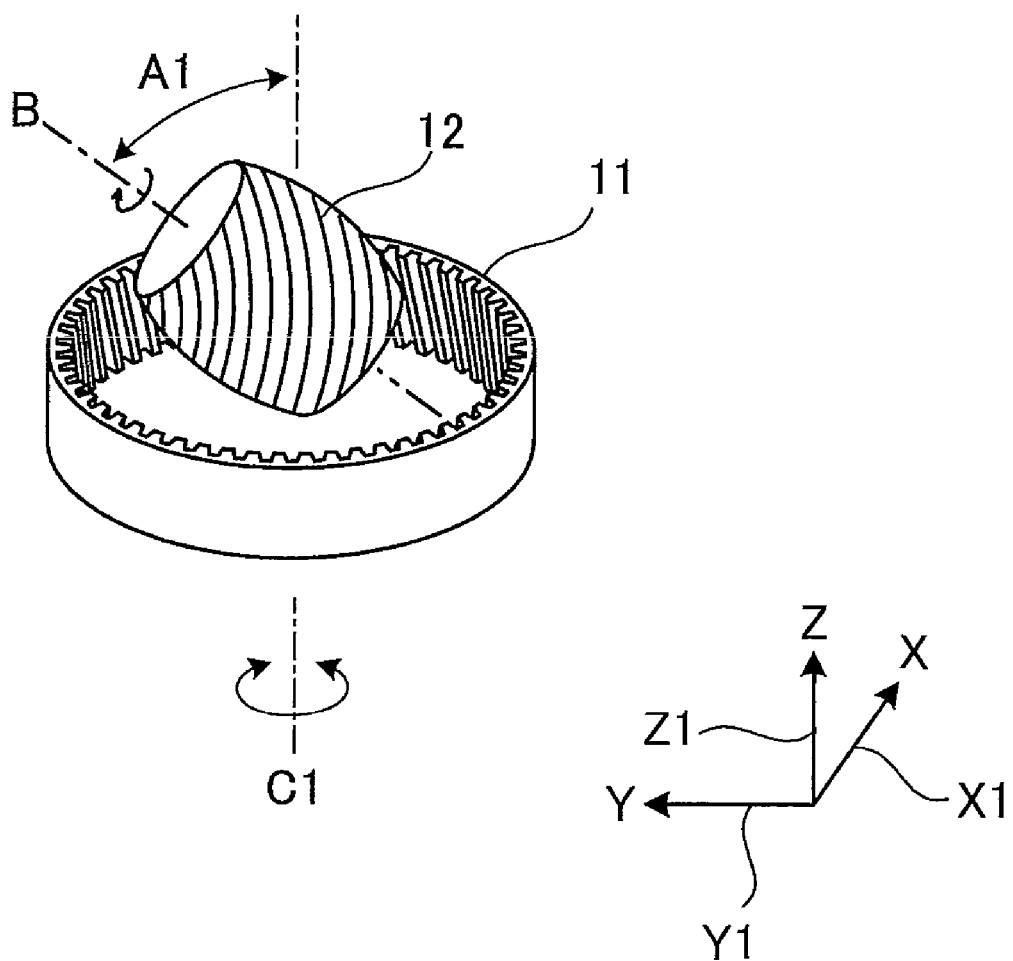
FIG. 1 is a view illustrating a support structure of an internal gear and a grinding wheel within an internal-gear grinding machine.
Figure 2:
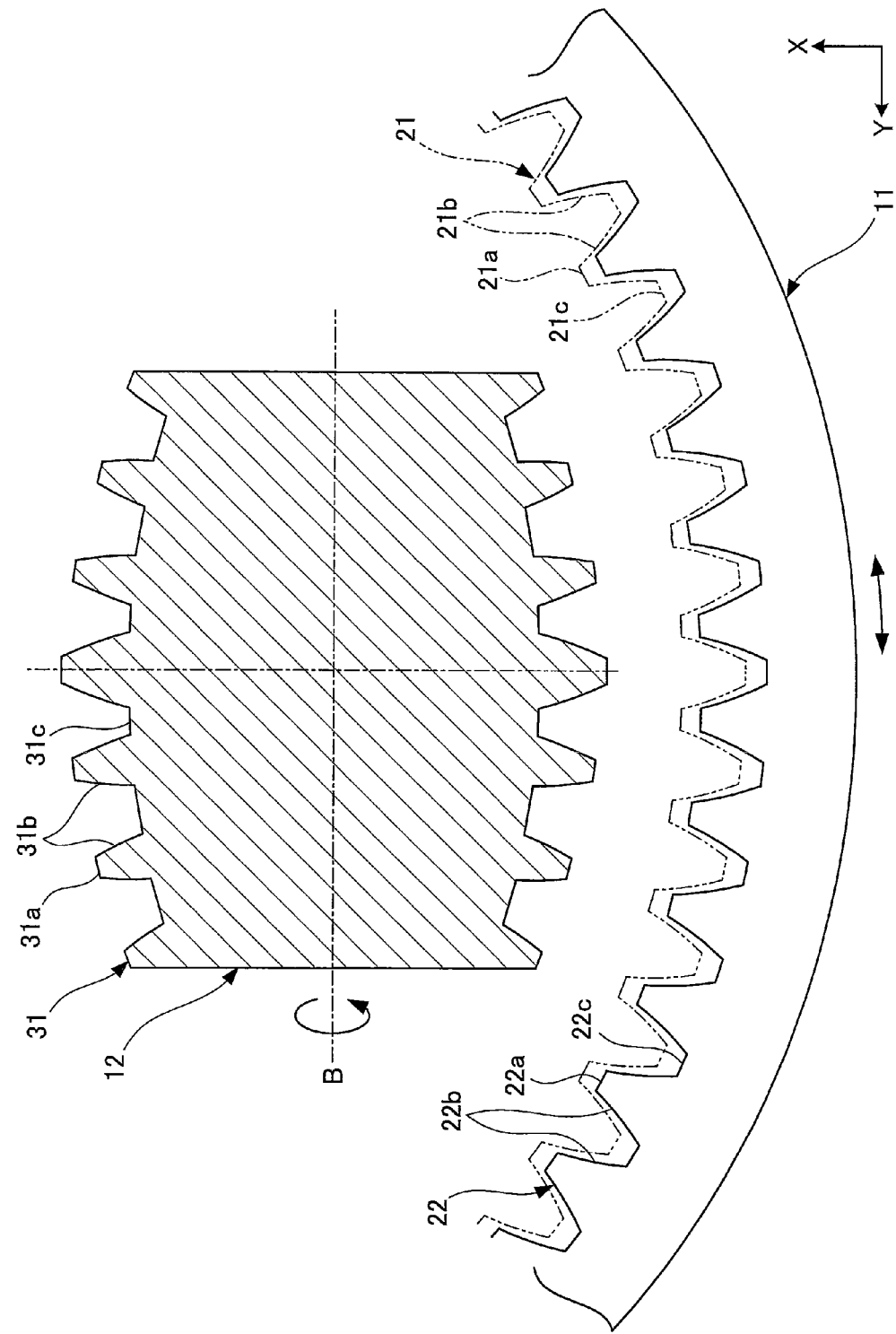
FIG. 2 is a view illustrating the shape of a grinding wheel according to a first embodiment of the present invention.
Figure 3:
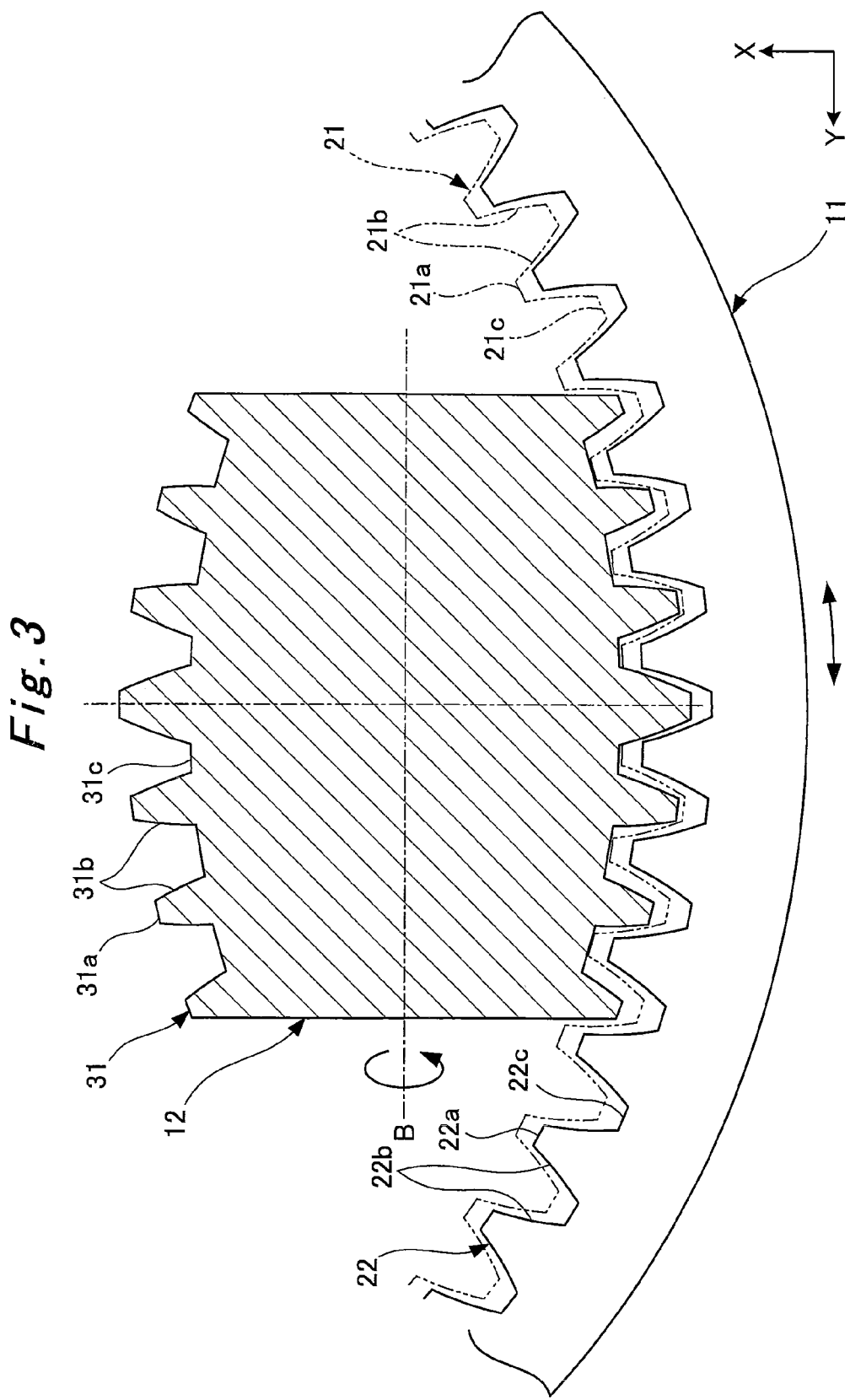
FIG. 3 is a view illustrating the grinding wheel according to the first embodiment of the present invention being used in the grinding of an internal gear.
Figure 4:
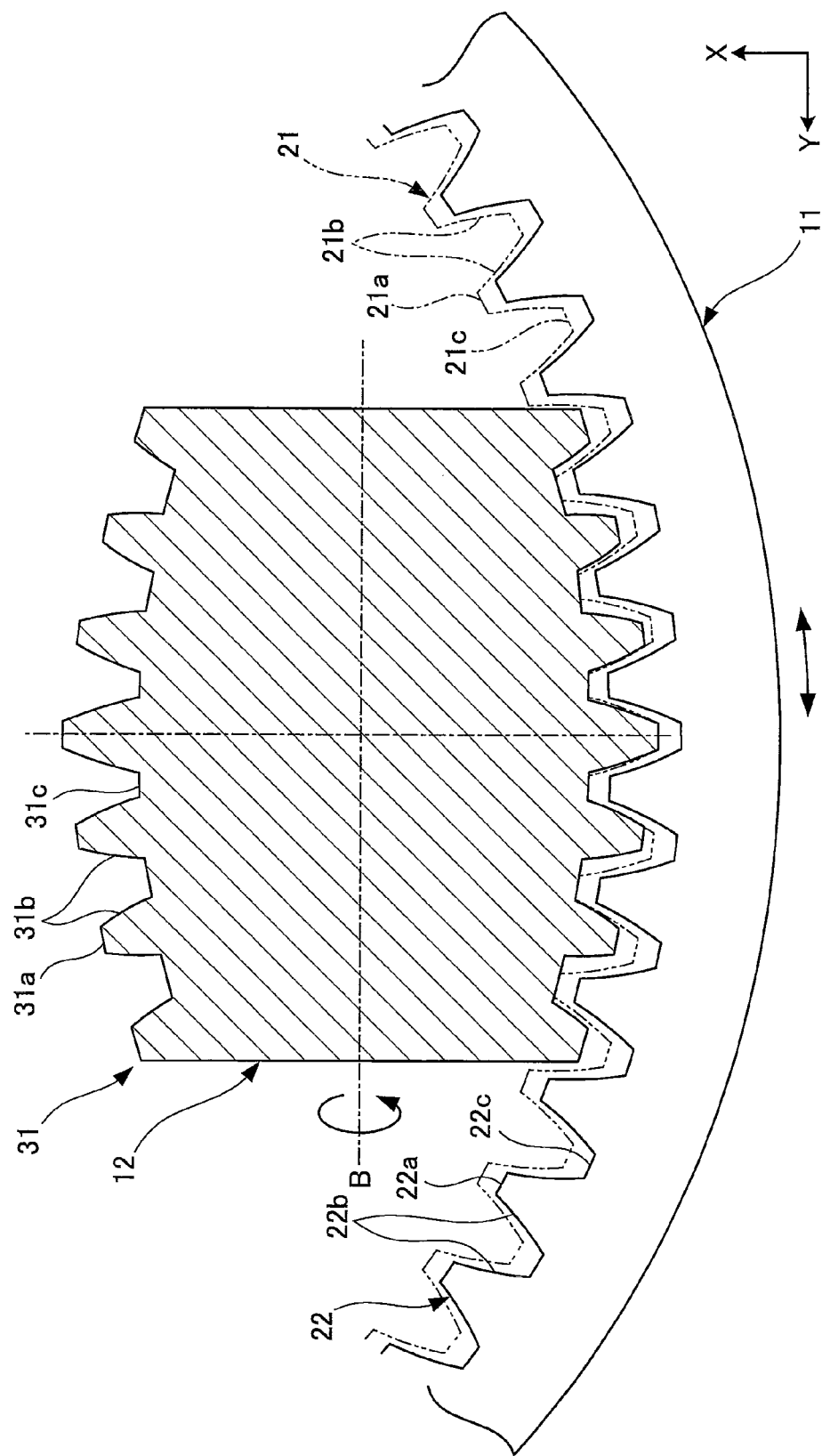
FIG. 4 is a view illustrating a grinding wheel according to a second embodiment of the present invention being used in the grinding of an internal gear.
Figure 5:
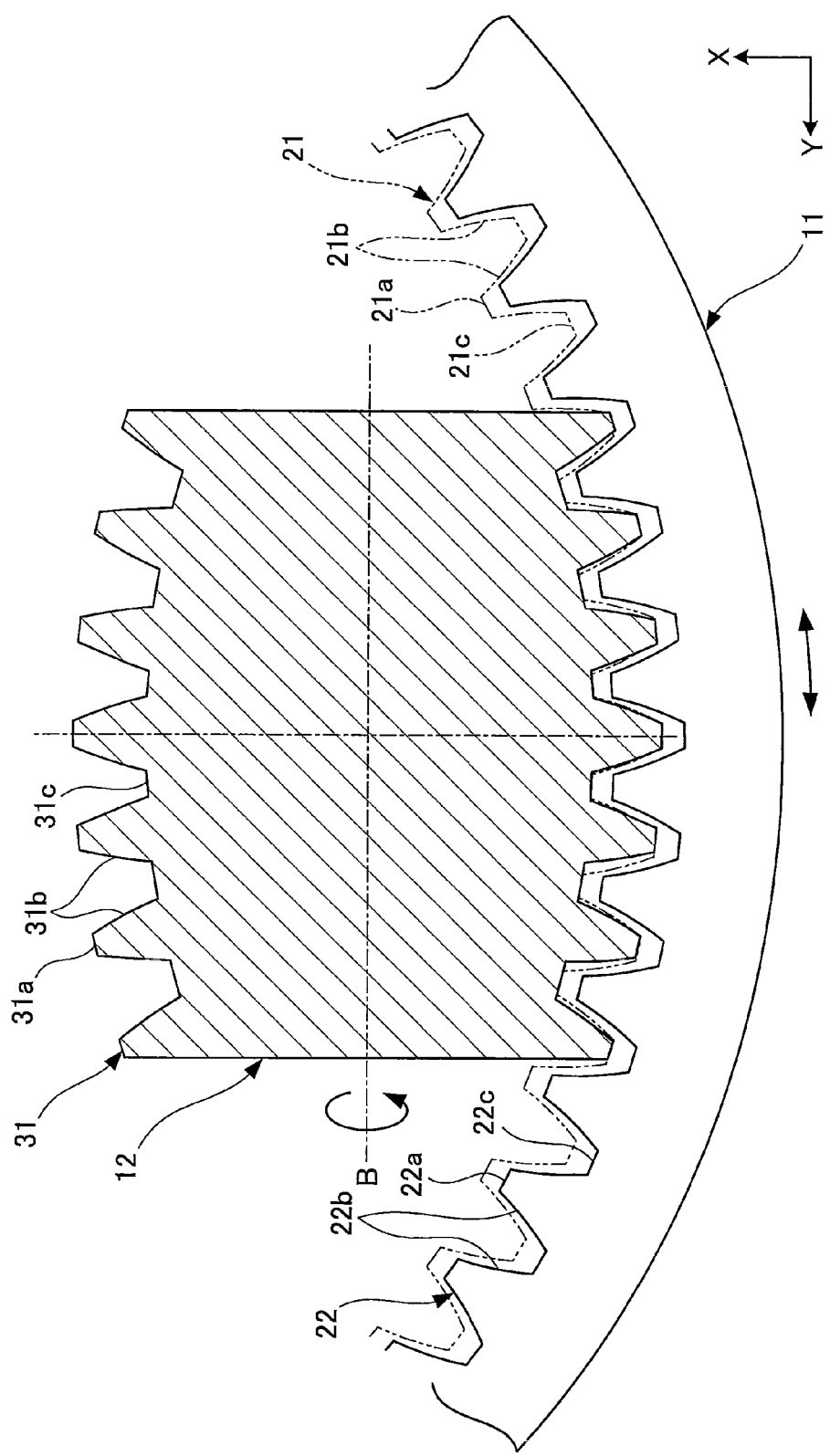
FIG. 5 is a view illustrating a grinding wheel according to a third embodiment of the present invention being used in the grinding of an internal gear.
Figure 6:
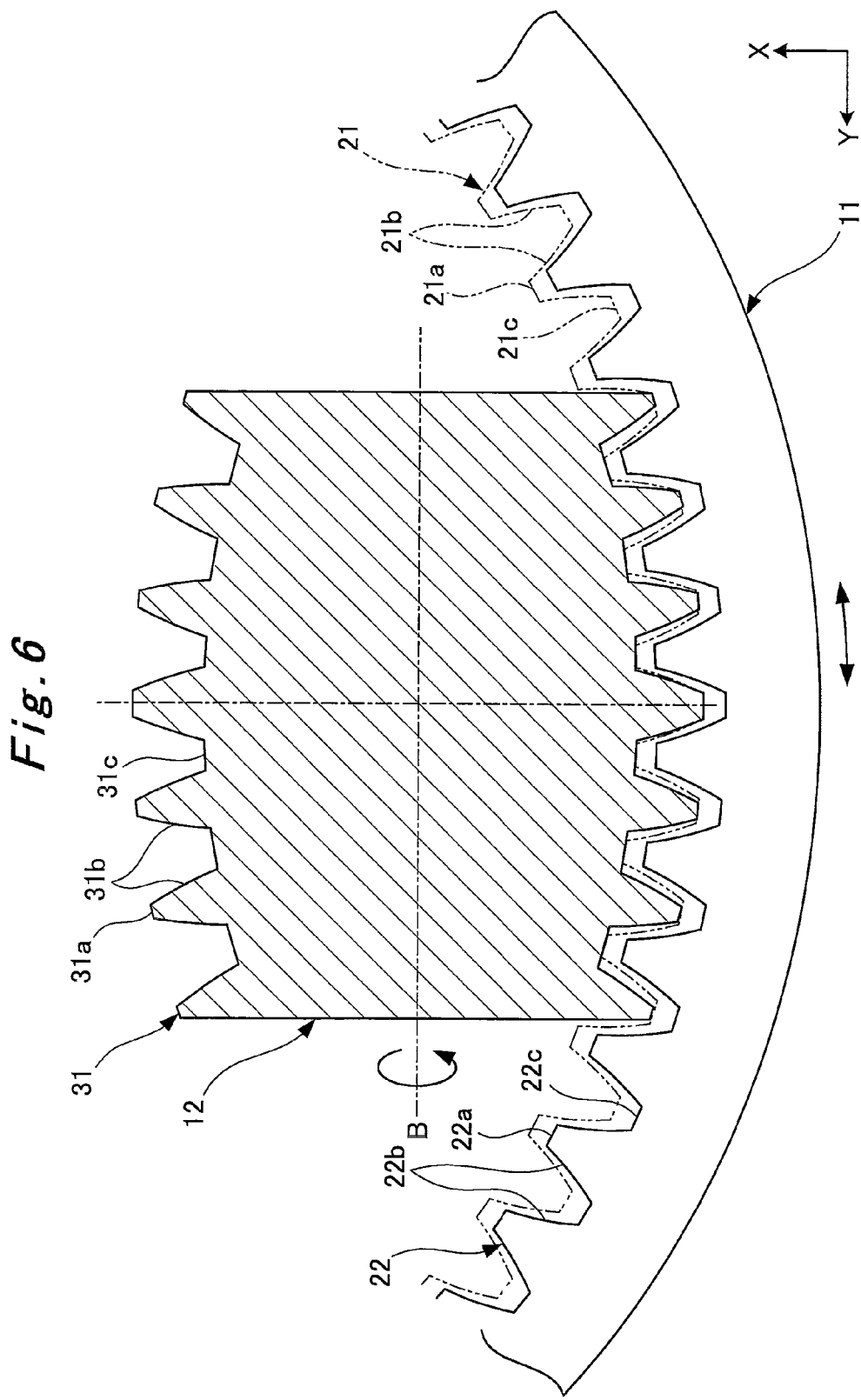
FIG. 6 is a view illustrating a grinding wheel according to a fourth embodiment of the present invention being used in the grinding of an internal gear.
Figure 7:
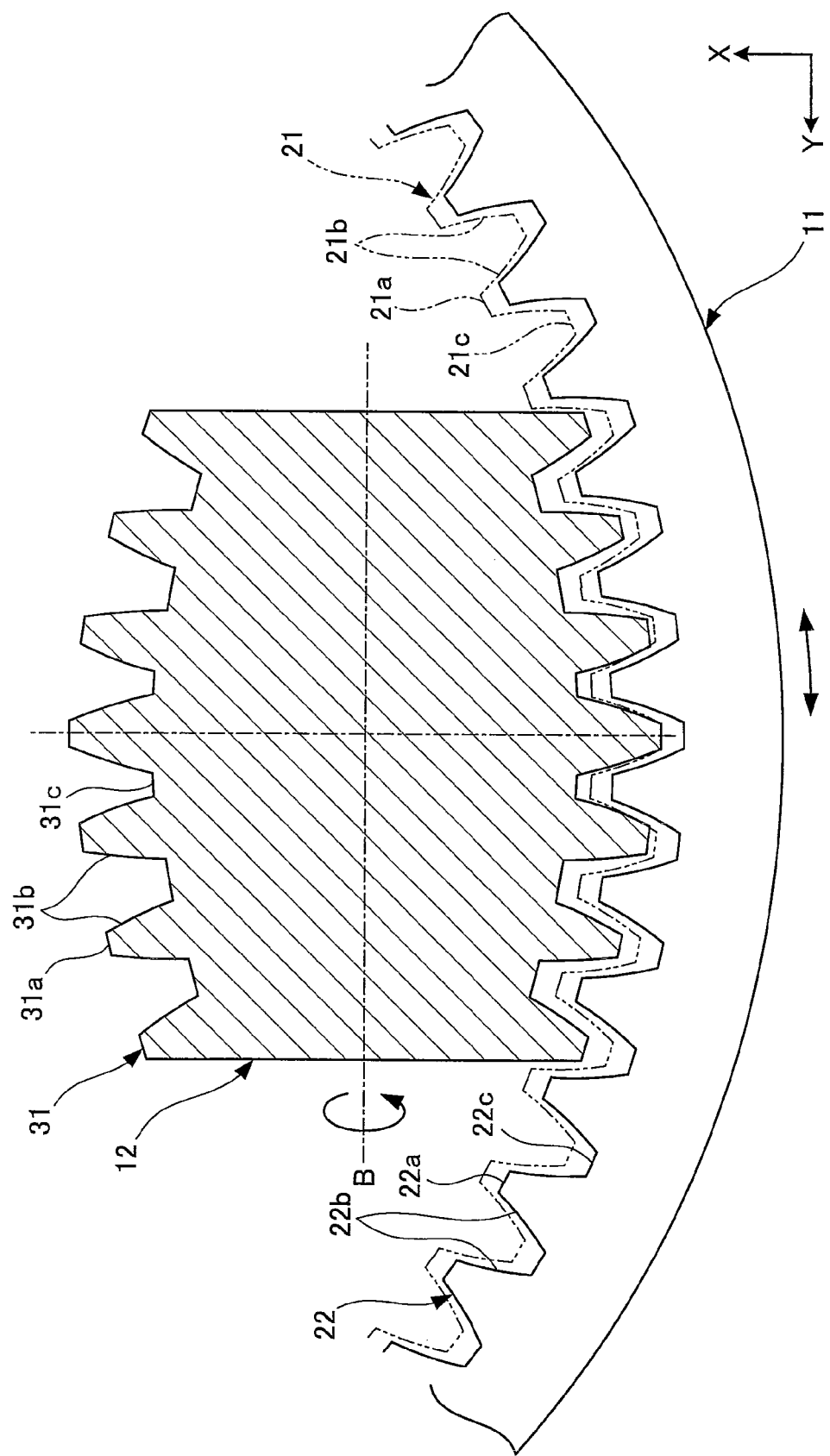
FIG. 7 is a view illustrating a grinding wheel according to a fifth embodiment of the present invention being used in the grinding of an internal gear.
Figure 8:
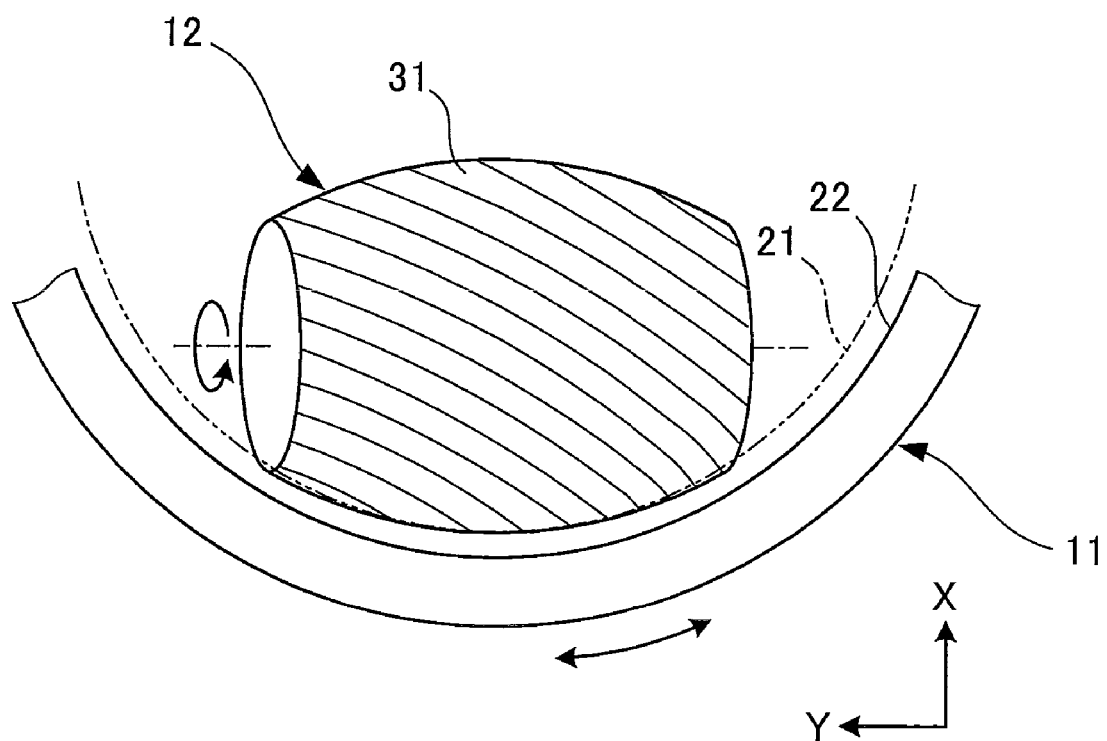
FIG. 8 is a view illustrating a conventional-type grinding wheel being used in the grinding of an internal gear.
Figure 9:
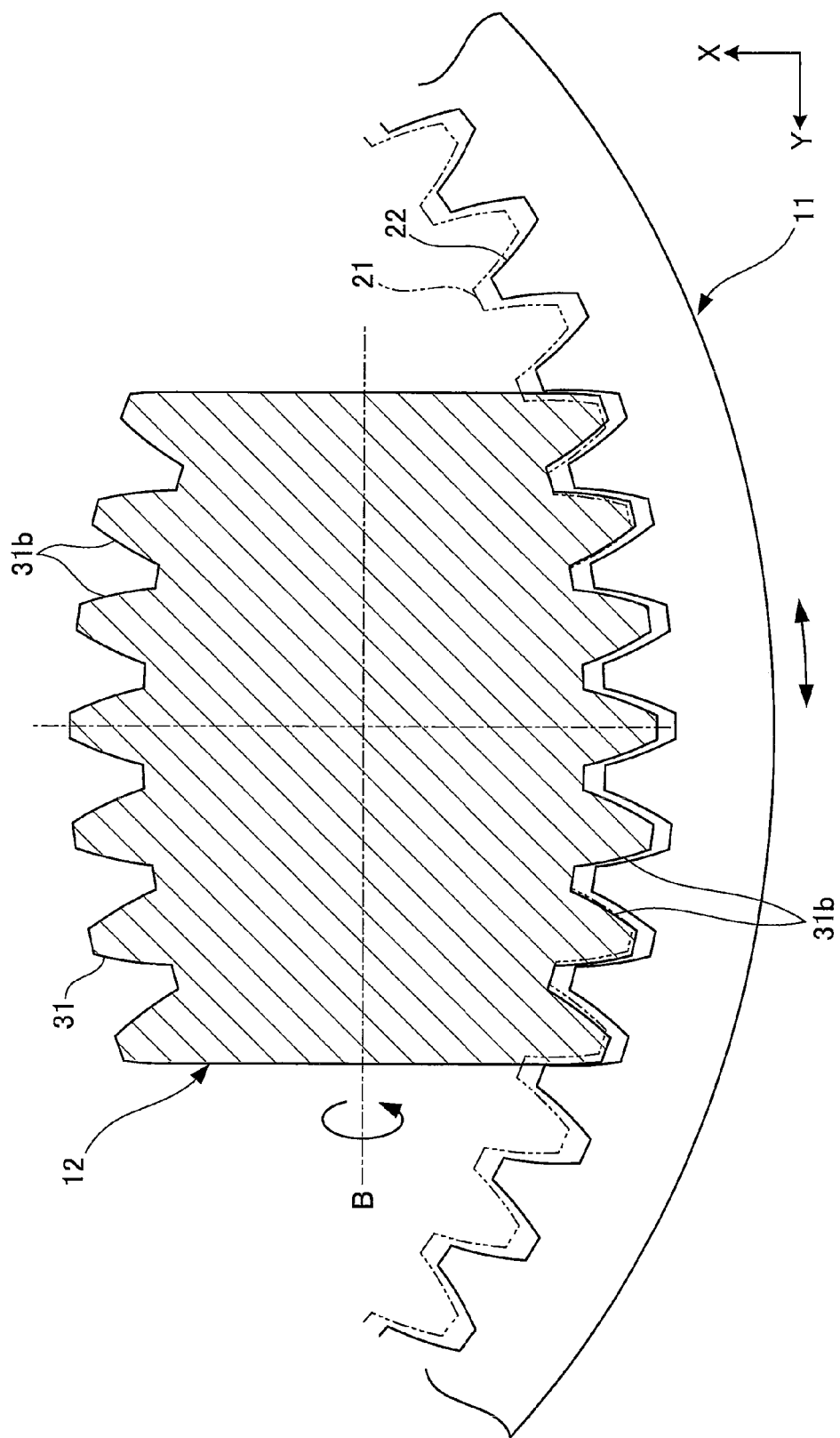
FIG. 9 is an enlarged view of a principal portion of FIG. 8.

FIG. 1 is a view illustrating a support structure of an internal gear and a grinding wheel within an internal-gear grinding machine. FIG. 2 is a view illustrating the shape of a grinding wheel according to a first embodiment of the present invention. FIG. 3 is a view illustrating the grinding wheel according to the first embodiment of the present invention being used in the grinding of an internal gear. FIG. 4 is a view illustrating a grinding wheel according to a second embodiment of the present invention being used in the grinding of an internal gear. FIG. 5 is a view illustrating a grinding wheel according to a third embodiment of the present invention being used in the grinding of an internal gear. FIG. 6 is a view illustrating a grinding wheel according to a fourth embodiment of the present invention being used in the grinding of an internal gear. FIG. 7 is a view illustrating a grinding wheel according to a fifth embodiment of the present invention being used in the grinding of an internal gear.

FIG. 1 shows a work, which is an internal helical gear (hereafter, referred to as an internal gear) 11, and a barrel worm-shaped tool, which is a grinding wheel 12. The internal gear 11 and the grinding wheel 12 are detachably supported in an unillustrated internal-gear grinding machine. Driving the internal-gear grinding machine makes the grinding wheel 12 grind the internal gear 11. The details of grinding processing will be described later.

The internal gear 11 is attached rotatably around a vertical work-rotating shaft C1. The grinding wheel 12 is attached rotatably around a grinding-wheel-rotating axis B that is angled at a predetermined shaft angle (shafts-crossing angle) A1 with respect to the work-rotating shaft C1. Concurrently, the grinding wheel 12 is supported by: a radial shaft X1 that extends horizontally in the x-axis direction (machine-feed direction); a work-rotating-shaft direction feed shaft Z1 that extends vertically in the z-axis direction; and a horizontal shaft Y1 that extends horizontally in the y-axis direction (machine-width direction) that is orthogonal both to the x-axis direction and to the z-axis direction. The grinding wheel 12 thus supported is movable in the x-axis, the y-axis, and the z-axis directions.

Subsequently, the shapes of the internal gears 11 and of the grinding wheel 12 will be described with reference to FIG. 2. Before being ground by grinding wheel 12, an internal gear is formed through a processing including a broaching processing on a predetermined material for a gear and a processing of cutting teeth (gear-shaper processing) thereon. The internal gear thus formed is then treated by heat and becomes the internal gear 11. Before the grinding processing, the inner circumferential surface of the internal gear 11 has machining-allowance tooth shapes 21, which serve as the machining-allowance, formed therein. The machining-allowance tooth shapes 21 include tooth-top faces 21a, tooth faces 21b, and bottom lands 21c. The tooth-top faces 21a and the tooth faces 21b form tooth portions of the machining-allowance tooth shapes 21. The grinding of the machining-allowance tooth shapes 21, using the grinding wheel 12, leaves final, post-machining tooth shapes 22, which include tooth-top faces 22a, tooth faces 22b, and bottom lands 22c. The tooth-top faces 22a and the tooth faces 22b form tooth portions of the tooth shapes 22. Here, the allowance of the tooth shapes 21 can have an arbitrarily-determined value.

The grinding wheel 12 is a barrel-shaped worm, in which its diameter gradually increases from each of the two end portions in the axial direction towards the middle portion in the axial direction. Spiral edge shapes 31 are formed in the outer circumferential surface of the grinding wheel 12. While the machining-allowance tooth shapes 21 of the internal gear 11 and the teeth of the tooth shapes 22 thereof have their respective internal-gear specifications, the worm specifications (external-gear specifications) of the edge shapes 31 allow the appropriate meshing of the edge shapes 31 both with the machining-allowance tooth shapes 21 and with the tooth shapes 22. In addition, the edge shapes 31 are formed so that the size of the edge shapes can become gradually smaller from the edge shapes located in the middle, in the axial direction, of the grinding wheel 12 to the edge shapes located in the two end portions, in the axial direction, of the grinding wheel 12. The edge shapes 31 include edge-top faces 31a, edge faces 31b, and bottom lands 31c. The edge-top faces 31a and the edge faces 31b form edge portions of the edge shapes 31.

To put it other way, the edge shapes 31 of the grinding wheel 12 are designed as follows. In the middle portion, in the axial direction, of the grinding wheel 12, the edges shape 31 can mesh with the corresponding tooth shapes 22 of the internal gear 11. Meanwhile, in the two end portions, in the axial direction, of the grinding wheel 12, the edge shapes 31 can mesh with the machining-allowance tooth shapes 21 of the internal gear 11. Both the thicknesses and the height of the edge shapes 31 gradually decrease from those of the edge shape 31 located in the middle portion, in the axial direction, of the grinding wheel 12 towards those of the edge shapes 31 located in the two end portions, in the axial direction, of the grinding wheel 12. To decrease gradually the edge thickness, the positions of the edge faces 31b on the two sides of each edge shape have to be shifted gradually inwards from the corresponding positions of the edge faces 31b of the reference edge shape 31 located in the middle portion, in the axial direction, of the grinding wheel 12.

The grinding of the internal gear 11 with grinding wheel 12 starts with moving the grinding wheel 12 to the machining position while the grinding wheel 12 is angled at the shaft angle A1. The radial shaft X1, the horizontal shaft Y1, and the work-rotating-shaft direction feed shaft Z1 are used for the purpose of moving the grinding wheel 12. As FIG. 1 shows, the edge shapes of the grinding wheel 12 thus moved are made to mate with the corresponding tooth shapes of the internal gear 11. Then, while the internal gear 11 is made to rotate around the work-rotating shaft C1 and the grinding wheel 12 is made to rotate around the grinding-wheel-rotating axis B, the grinding wheel 12 is made to oscillate in the z-axis direction by means of the work-rotating-shaft direction feed shaft Z1.

The grinding processing starts in this way. The edge shapes 31 of the grinding wheel 12 are allowed to grind the entire area, in the width direction of the internal gear 11, of the machining-allowance tooth shapes 21. Here, both the internal gear 11 and the grinding wheel 12 that mesh with each other rotate synchronously with each other while the axis of the internal gear 11 and the axis of the grinding wheel 12 together form the shaft angle A1. Accordingly, the relative sliding speed between the tooth face of the internal gear 11 and the edge face of the grinding wheel 12 increases, and the increase in the relative sliding speed, in turn, increases the grinding speed.

The mating of the edge shapes and the tooth shapes is carried out so that the reference edge shape 31 located in the middle portion, in the axial direction, of the grinding wheel 12 can mate with the corresponding machining-allowance tooth shapes 21 of the internal gear 11. Accordingly, even though the reference edge shape 31 located in the middle portion in the axial direction has a shape that is capable of meshing with the corresponding tooth shapes 22 of the internal gear 11, the reference edge shape 31 can mesh with the machining-allowance tooth shapes 21 of the internal gear 11. In addition, as described above, the edge shapes 31 located in the two end portions, in the axial direction, of the grinding wheel 12 can mesh with the corresponding machining-allowance tooth shapes 21 of the internal gear 11. Moreover, the edge shapes 31 of the grinding wheel 12 are formed so that the thicknesses and the heights of the edge shapes 31 may gradually decrease from those of the edge shape 31 located in the middle, in the axial direction, of the grinding wheel 12 to those of the edge shapes located in the two end portions, in the axial direction, of the grinding wheel 12. Accordingly, the edge shapes 31 can appropriately mesh with the machining-allowance tooth shapes 21 of the internal gear 11 across the entire area, in the axial direction, of the grinding wheel 12.

Subsequently, when the grinding wheel 12 is moved in the x-axis direction by means of the radial shaft X1 and the feed amount towards the internal gear 11 increases, the edge shapes of the grinding wheel 12 gradually grind the machining-allowance tooth shapes 21 of the internal gear 11. In addition, of all the areas of the edge shapes 31 in the axial direction of the grinding wheel 12, the area actually involved in the grinding of the machining-allowance tooth shapes 21 is gradually being narrowed down, by the increase in the feed amount, from the two end portions in the axial direction of the grinding wheel 12 towards the middle portion in the axial direction thereof.

Once the grinding wheel 12 has been fed in the x-axis direction by a predetermined amount, all the machining-allowance tooth shapes 21 have been ground off. As a consequence, the tooth shapes 22 are formed, and the grinding processing is completed. The final stage of formation of the tooth shapes 22 is carried out by the edge shape 31 located in the middle portion, in the axial direction, of the grinding wheel 12.

Here, the edge-top faces 31a of the edge shapes 31 gradually grind the bottom lands 21c of the machining-allowance tooth shapes 21, so that the bottom lands 22c of the tooth shapes 22 are formed. In addition, the edge faces 31b of the edge shapes 31 gradually grind the tooth faces 21b of the machining-allowance tooth shapes 21, so that the tooth faces 22b of the tooth shapes 22 are formed. Moreover, the bottom lands 31c of the edge shapes 31 gradually grind the tooth-top faces 21a of the machining-allowance tooth shapes 21, so that the tooth-top faces of the tooth shapes 22 are formed.

There is an alternative configuration that is possible in a case where the edge shapes 31 are formed so that the thicknesses and the heights of the edge shapes 31 can gradually decrease from those of the edge shape 31 located in the middle portion, in the axial direction, of the grinding wheel 12 to those of the edge shapes 31 located in the two end portions, in the axial direction, of the grinding wheel 12. In the alternative configuration, to decrease gradually the edge thickness, as FIG. 4 shows, only the positions of the edge faces 31b on the outer sides of the edge shapes 31 may be shifted gradually inwards from the corresponding position of the edge face 31b of the reference edge shape 31 located in the middle portion, in the axial direction, of the grinding wheel 12.

In another alternative configuration, the edge shapes 31 may be formed so that only the thicknesses of the edge shapes 31 can gradually decrease from the edge shape 31 located in the middle portion, in the axial direction, of the grinding wheel 12 towards the edge shapes 31 located in the two end portions, in the axial direction, of the grinding wheel 12. In this case, to decrease gradually the edge thickness, as FIG. 5 shows, only the positions of the edge faces 31b on the outer sides of the edge shapes 31 may be shifted gradually inwards from the corresponding position of the edge face 31b of the reference edge shape 31 located in the middle portion, in the axial direction, of the grinding wheel 12. In a still another alternative configuration, to decrease gradually the edge thickness, as FIG. 6 shows, the positions of the edge faces 31b on the two sides of the edge shapes 31 may be shifted gradually inwards from the corresponding positions of the edge faces 31b of the reference edge shape 31 located in the middle portion, in the axial direction, of the grinding wheel 12.

There is an even still another alternative configuration that is possible in a case where the edge shapes 31 are formed so that the thicknesses and the heights of the edge shapes 31 can gradually decrease from those of the edge shape 31 located in the middle portion, in the axial direction, of the grinding wheel 12 to those of the edge shapes 31 located in the two end portions, in the axial direction, of the grinding wheel 12. In the even still another alternative configuration, as FIG. 7 shows, the heights of the bottom lands 31c may also gradually decrease. While the tooth-top faces 21a of the tooth shapes 21 collide with the bottom lands 31c, the above-mentioned configuration helps the alleviation of the collision that takes place at the time of meshing.

As has been described thus far, in the barrel worm-shaped tool according to the present invention, the edge shapes 31 of the grinding wheel 12 are formed so that the size of the edge shapes can gradually become smaller, in accordance with the amount of machining allowance of the internal gear 11, from the edge shapes located in the middle portion, in the axial direction, of the grinding wheel 12 to the edge shapes located in the two end portions, in the axial direction, of the grinding wheel 12. Accordingly, at the time of mating the edge shapes and tooth shapes, the outer-side edge face 31b of each of the edge shapes 31 located on the two end portions, in the axial direction, of the grinding wheel 12, which are the edge shapes 31 located on the outer sides of the edge shape 31 located in the middle portion, in the axial direction, of the grinding wheel 12, is brought into appropriate contact with the corresponding tooth face 21b of the machining-allowance tooth shapes 21. Accordingly, the edge shapes 31 can mesh with the machining-allowance tooth shapes 21 across the entire area, in the axial direction, of the edge shapes 31. As a consequence, the machining load and the partial wear can be reduced and thus high-precision grinding processing is made possible.

INDUSTRIAL APPLICABILITY

The present invention is applicable to a barrel-shaped tool used in the cutting of teeth in an internal gear.

The invention claimed is:

1. A barrel worm-shaped tool used in the gear machining of an internal gear and formed with its diameter gradually increasing from the two end portions in an axial direction thereof towards the middle portion in the axial direction thereof, wherein the barrel worm-shaped tool is formed so that edge shapes become gradually smaller from an edge shape located in the middle portion, in the axial direction, of the barrel worm-shaped tool towards edge shapes located in the two end portions, in the axial direction, of the barrel worm-shaped tool in accordance with an amount of machining allowance for the internal gear.

2. The barrel worm-shaped tool according to claim 1 wherein the edge shape located in the middle portion in the axial direction is designed to have a shape capable of meshing with corresponding tooth shapes of the internal gear after the machining, and the edge shapes located in the two end portions in the axial direction are designed to have shapes capable of meshing with corresponding machining-allowance tooth shapes of the internal gear.

3. The barrel worm-shaped tool according to claim 1 wherein the barrel worm-shaped tool is foamed with a thickness of the edge shapes gradually decreasing.

4. The barrel worm-shaped tool according to claim 1 wherein the barrel worm-shaped tool is formed with heights of the edge shapes gradually decreasing.

5. The barrel worm-shaped tool according to claim 1 wherein the barrel worm-shaped tool is formed with heights of bottom lands of the edge shapes gradually decreasing.

* * * * *